(12) United States Patent
Takehara et al.

(10) Patent No.: US 6,564,898 B2
(45) Date of Patent: May 20, 2003

(54) ELECTRIC POWER STEERING APPARATUS FOR MOTOR VEHICLE

(75) Inventors: Shin Takehara, Hiroshima (JP); Kiyoshi Sakamoto, Hiroshima (JP)

(73) Assignee: Mazda Motor Corporation (JP)

( * ) Notice: Subject to any disclaimer, the term of this patent is extended or adjusted under 35 U.S.C. 154(b) by 0 days.

(21) Appl. No.: 09/922,789

(22) Filed: Aug. 7, 2001

(65) Prior Publication Data

US 2002/0020577 A1 Feb. 21, 2002

(30) Foreign Application Priority Data

Aug. 10, 2000 (JP) ........................................ 2000-242088

(51) Int. Cl.[7] ................................................. B62D 5/04
(52) U.S. Cl. ........................................ 180/444; 180/443
(58) Field of Search ................................. 180/443, 444; 701/41, 42; 74/422

(56) References Cited

U.S. PATENT DOCUMENTS

| | | | | |
|---|---|---|---|---|
| 3,753,378 A | * | 8/1973 | Bishop | 74/422 |
| 4,444,070 A | * | 4/1984 | Yanai | 74/422 |
| 4,573,372 A | * | 3/1986 | Abe | 74/422 |
| 4,619,155 A | * | 10/1986 | Futaba | 74/498 |
| 4,753,308 A | * | 6/1988 | Noto et al. | 180/446 |
| 4,849,889 A | * | 7/1989 | Morishita et al. | 180/446 |
| 4,869,334 A | * | 9/1989 | Marumoto et al. | 180/404 |
| 5,203,421 A | * | 4/1993 | Ueno et al. | 180/400 |
| 5,623,409 A | * | 4/1997 | Miller | 180/443 |
| 5,687,811 A | * | 11/1997 | Shimizu | 180/447 |
| 5,785,145 A | * | 7/1998 | Wakao et al. | 180/443 |
| 5,788,010 A | * | 8/1998 | Mukai et al. | 180/443 |
| 5,860,323 A | * | 1/1999 | Mizutani et al. | 74/422 |
| 5,887,675 A | * | 3/1999 | Hackl et al. | 180/422 |
| 5,894,205 A | * | 4/1999 | Shimizu et al. | 180/446 |
| 6,102,151 A | * | 8/2000 | Shimizu et al. | 180/443 |
| 6,268,669 B1 | * | 7/2001 | Wakao et al. | 180/443 |
| 6,367,577 B2 | * | 4/2002 | Murata et al. | 180/446 |
| 6,422,335 B1 | * | 7/2002 | Miller | 180/446 |

FOREIGN PATENT DOCUMENTS

JP 09-136655 A 5/1997

* cited by examiner

*Primary Examiner*—Lesley D. Morris
*Assistant Examiner*—Daniel Yeagley
(74) *Attorney, Agent, or Firm*—Nixon Peabody LLP; Donald R. Studebaker

(57) ABSTRACT

In an electric power steering apparatus for a motor vehicle comprising a rack shaft (1) provided with first and second rack portions (14 and 15), a pinion (21) of a steering shaft for meshing with the first rack portion (14), and a pinion (31) of an electric motor (34) for meshing with the second rack portion (15), the first rack portion (14) is constructed to have a constant gear ratio and the second rack portion (15) is constructed to have a variable ratio so that an abnormal feeling during a steering operation is prevented and the lock to lock of a steering wheel is reduced to a small value.

3 Claims, 5 Drawing Sheets

ELECTRIC POWER STEERING APPARATUS FOR MOTOR VEHICLE

BACKGROUND OF THE INVENTION

The present invention relates to an electric power steering apparatus for a motor vehicle which assists a steering wheel force by using the driving torque of an electric motor.

As a conventional electric power steering apparatus of this type, there has been known one provided with a ball thread mechanism which converts the driving torque of the electric motor to the thrust force of a rack shaft for meshing with the pinion of a steering shaft (see, e.g., Japanese Unexamined Patent Publication No. HEI 9-136655). In the conventional electric power steering apparatus, the rack portion for meshing with the pinion of the steering shaft is constructed to have a variable gear ratio which changes in response to a steering wheel rotation angle. Specifically, a rack portion has a gear ratio such that, when the steering wheel rotation angle is small, a variation in steered wheel angle responsive to the variation in steering wheel rotation angle is small and, when the steering wheel rotation angle is large, a variation in steered wheel angle responsive to the variation in steering wheel rotation angle is large. Such a rack portion having a variable gear ratio has the advantage of improved operability in each of a region where a vehicle drives straight ahead and a region where the vehicle corners since the response of the vehicle is slow in the straight-ahead region with a small steering wheel rotation angle, while it is quick in the cornering region with a large steering wheel rotation angle. Since the large steering wheel rotation angle reduces the gear ratio, the steering force of a steering wheel is reduced. This offers the advantage of reducing a required auxiliary steering force and providing a driving torque required for the generation of the auxiliary steering force even if the electric motor is small in size.

However, if the rack portion of a steering shaft has a variable gear ratio as in the conventional electric power steering apparatus for a motor vehicle, the gear ratio changes as the driver turns up the steering wheel and a variation in steered wheel angle responsive to a variation in steering wheel rotation angle changes accordingly, which causes an abnormal feeling in the driver.

If the rack portion of the steering shaft has a variable gear ratio and the lock to lock of the steering wheel is not increased compared with the case where the rack portion has a constant gear ratio, a desired overall steering gear ratio is not achieved.

The present invention has been achieved in view of the foregoing circumstances. It is therefore an object of the present invention to prevent the driver from feeling abnormal during a steering operation and reduce the lock to lock of a steering wheel in an electric power steering apparatus for a motor vehicle which assists a steering wheel operation performed by using an electric motor.

SUMMARY OF THE INVENTION

To attain the object, the present invention has provided a rack shaft with first and second rack portions, of which the first rack portion for meshing with the pinion of a steering shaft has a constant gear ratio and the second rack portion for meshing with the pinion of an electric motor has a variable gear ratio.

Specifically, the present invention aims at an electric power steering apparatus for a motor vehicle which assists a steering wheel operation by using an electric motor, the apparatus comprising: a rack shaft; first and second rack portions provided in the rack shaft; a pinion of a steering shaft for meshing with the first rack portion; and a pinion of the electric motor for meshing with the second rack portion.

The present invention specifies that the first rack portion is constructed to have a constant gear ratio and the second rack portion is constructed to have a variable gear ratio.

Since the first rack portion for meshing with the pinion of the steering shaft is constructed to have a constant gear ratio, a desired overall steering gear ratio is achievable even if the lock to lock of a steering wheel is reduced compared with the case where the first rack portion is constructed to have a variable ratio. In short, the lock to lock of the steering wheel can be reduced to a small value. Even if the steering wheel is turned up, a variation in steered wheel angle responsive to a variation in steering wheel rotation angle is constant since the first rack portion has the constant gear ratio. This allows the driver to perform a steering operation with a steady steering sense and prevents the driver from feeling abnormal.

In the electric power steering apparatus, the second rack portion is preferably constructed to have a gear ratio such that a driving torque of the electric motor is nearly constant irrespective of a steering wheel rotation angle.

If the second rack portion is constructed to have a gear ratio such that the driving torque of the electric motor changes in response to the steering wheel rotation angle, the driving torque of the electric motor changes as the driver turns up the steering wheel. Since a steering counterforce changes with the changing driving torque of the electric motor, the driver feels abnormal. If the second rack portion is constructed to have a gear ratio such that the driving torque of the electric motor is nearly constant irrespective of the steering wheel rotation angle, by contrast, the steering counterforce does not change even when the steering wheel is turned up. This prevents the driver from feeling abnormal.

Preferably, the second rack portion is constructed such that the variation in steered wheel angle responsive to the variation in steering wheel rotation angle is smaller with a large steering wheel rotation angle than with a small steering wheel rotation angle.

If the steering wheel rotation angle is large, the steering force of the steering wheel is large. Accordingly, the auxiliary steering force exerted by the electric motor should also be increased. If the second rack portion is constructed such that the variation in steered wheel angle responsive to the variation in steering wheel rotation angle is smaller with the large steering wheel rotation angle than with the small steering wheel rotation angle, the gear ratio between the pinion of the electric motor and the second rack portion provides a large auxiliary steering force even if the driving torque of the electric motor is small. This allows the use of a small-sized electric motor.

If the second rack portion is constructed such that the variation in steered wheel angle responsive to the variation in steering wheel rotation angle is smaller with the large steering wheel rotation angle, the response of the electric motor becomes slower. However, the steering wheel rotation angle is large when the vehicle is driving at a low speed, e.g., when the vehicle is being garaged. Therefore, the slower response of the electric motor does not cause a problem. In the case of counter steering, the steering wheel rotation angle is large even when the vehicle is driving at a high speed. However, since a tire is skidding during counter steering, the counterforce of the tire is extremely small.

Accordingly, the required auxiliary steering force is small and the slow response of the electric motor does not cause a problem.

Preferably, the second rack portion is constructed such that the variation in steered wheel angle responsive to the variation in steering wheel rotation angle is nearly constant irrespective of the steering wheel rotation angle when the steering wheel rotation angle is smaller than a specified angle and that the variation in steered wheel angle responsive to the variation in steering wheel rotation angle decreases with an increase in steering wheel rotation angle when the steering wheel rotation angle is equal to or larger than the specified angle.

In the straight-ahead region where the steering wheel rotation angle is smaller than the specified angle, the second rack portion is constructed to have a nearly constant gear ratio so that the auxiliary steering force responsive to a steering wheel operation has a nearly constant characteristic. As a consequence, the steering counterforce responsive to the steering wheel operation is nearly constant in the region where the vehicle drives straight ahead, which prevents the driver from feeling abnormal.

At this time, the second rack portion is preferably constructed to have a gear ratio such that a driving torque of the electric motor is nearly constant irrespective of the steering wheel rotation angle. The arrangement prevents the steering counterforce from changing even when the steering wheel is turned up and thereby prevents the driver from feeling abnormal.

DETAILED DESCRIPTION OF THE INVENTION

Figure 1:
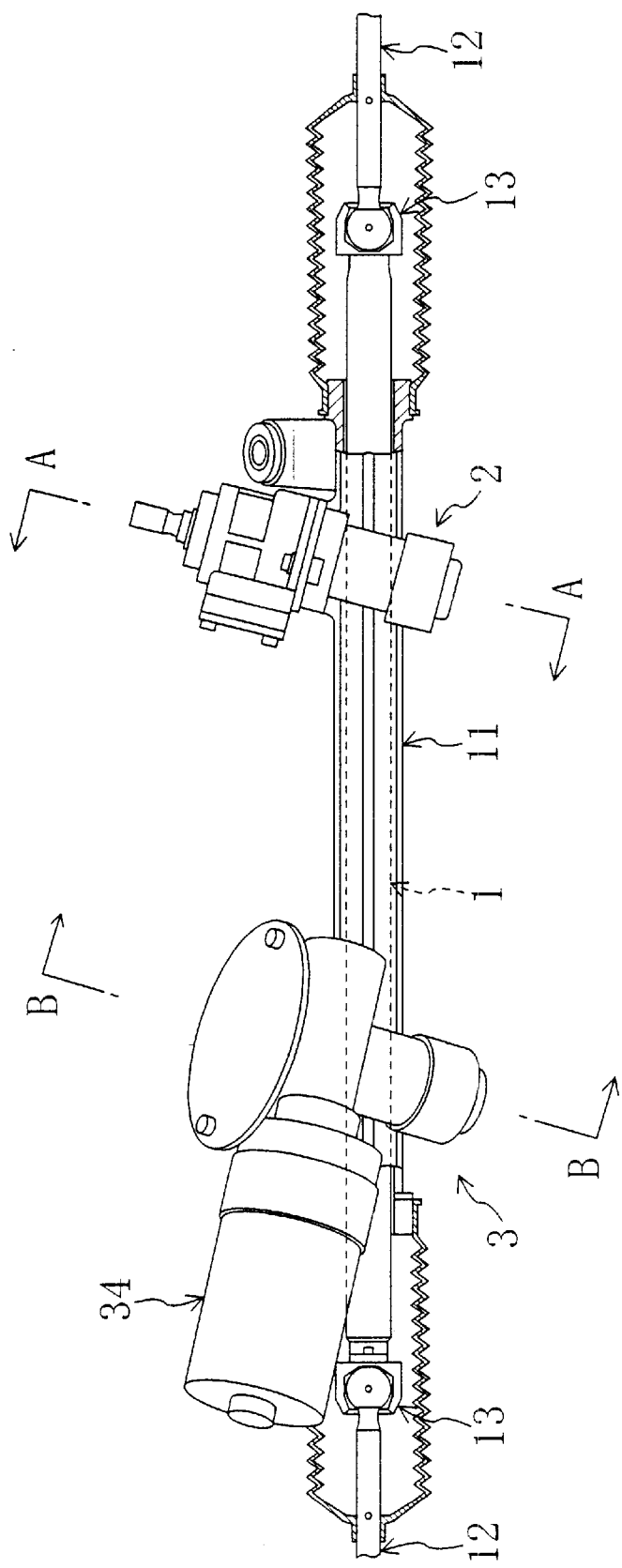
FIG. 1 is a front view of a gear box of an electric power steering apparatus according to an embodiment of the present invention.

Referring now to the drawings, an embodiment of the present invention will be described.

FIG. 1 shows a gear box of an electric power steering apparatus for a motor vehicle according to the present invention, which comprises a rack shaft 1 provided in a casing 11, a steering gear 2 coupled to the rack shaft 1, and an electric motor gear 3 coupled to the rack shaft 1.

Figure 2:
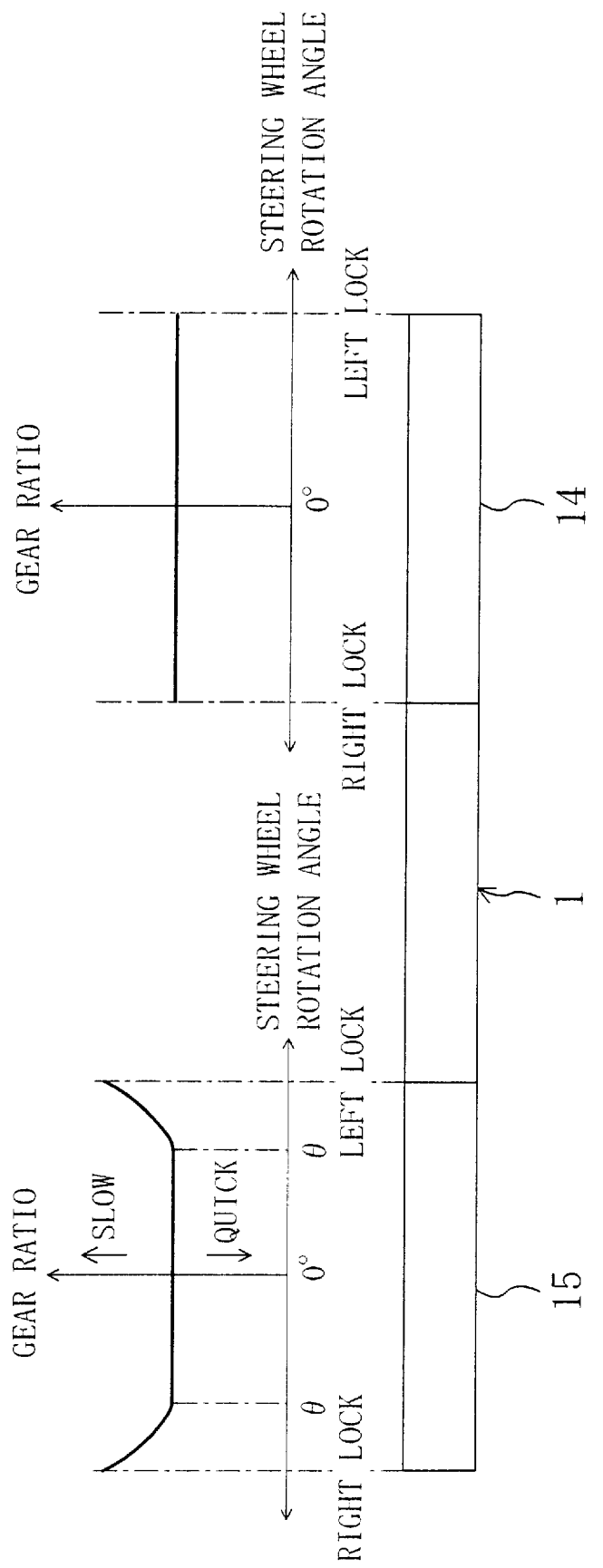
FIG. 2 shows a structure of first and second rack portions of a rack shaft.
Figure 3:
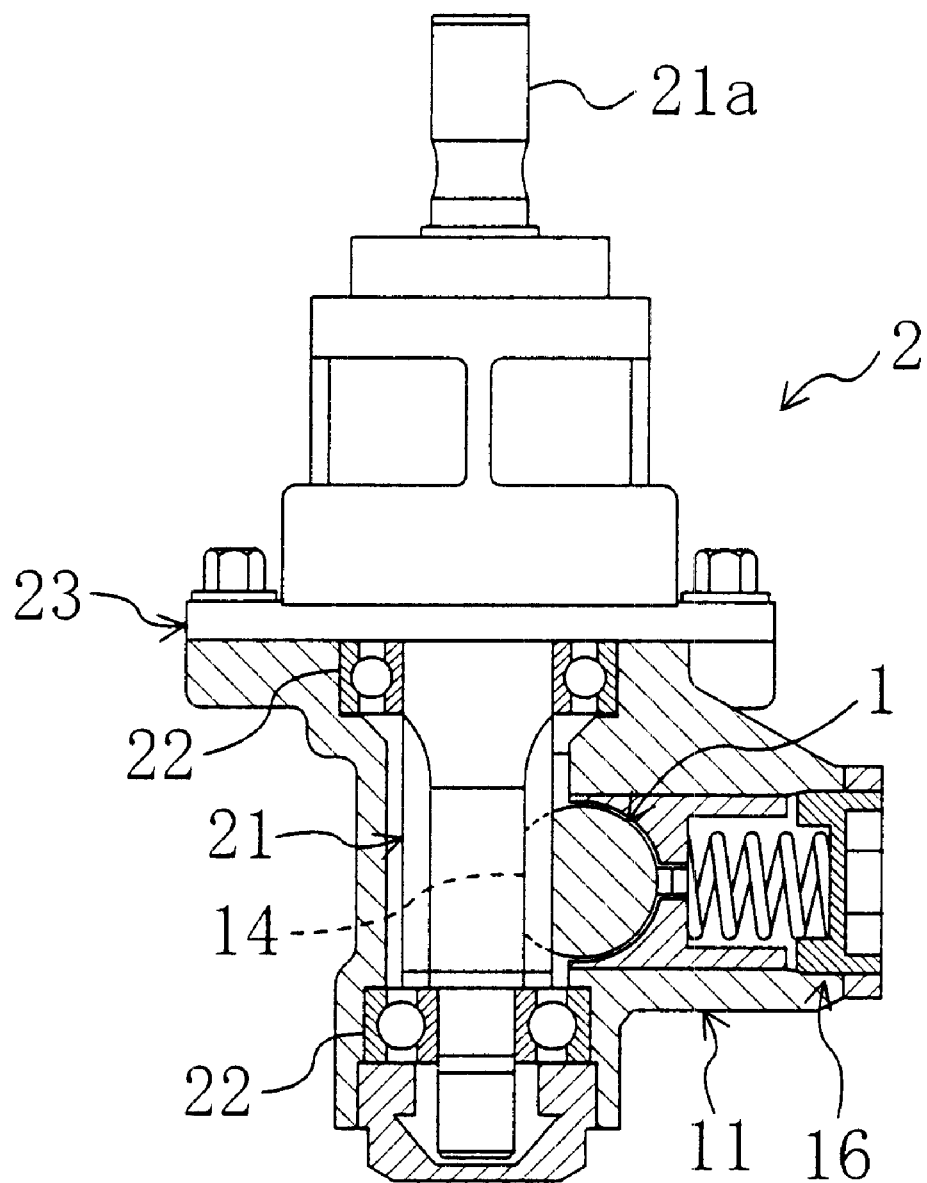
FIG. 3 is a cross-sectional view taken along the line A—A of FIG. 1.
Figure 4:
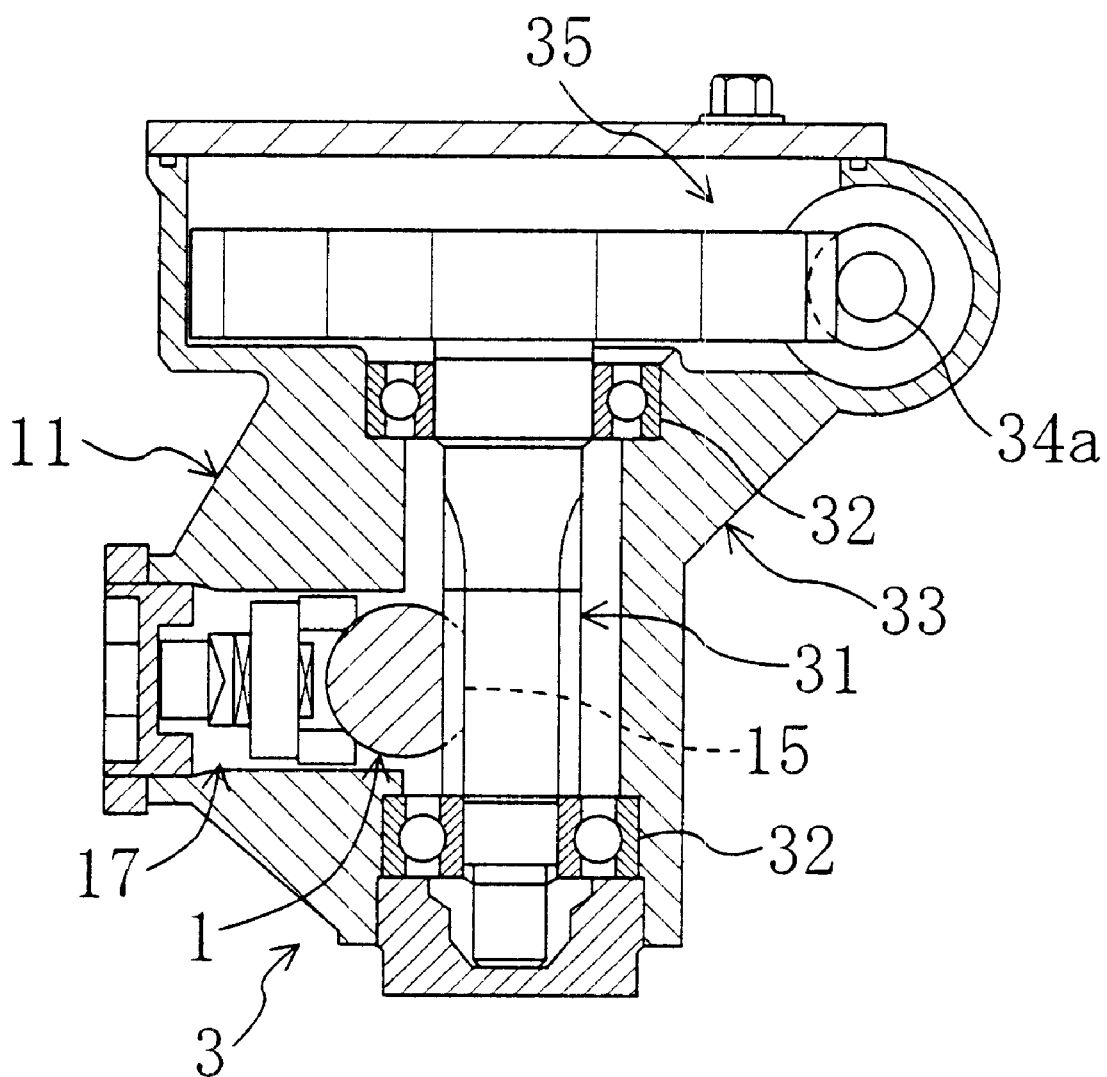
FIG. 4 is a cross-sectional view taken along the line B—B of FIG. 1.

The rack shaft 1 is disposed to extend along the width of the vehicle and have both end portions coupled to tie rods 12 via respective ball joints 13. The tie rods 12 protrude sideways from the casing 11 along the width of the vehicle and have tips coupled to respective wheels which are not shown. As shown in FIGS. 2 to 4, the rack shaft 1 is provided with a first rack portion 14 for meshing with the steering gear 2 and a second rack portion 15 for meshing with an electric motor gear 3 which are arranged in series.

The steering gear 2 is disposed at a position offset from the longitudinal center position of the rack shaft 1 along the width of the vehicle. As shown in FIG. 3, the steering gear 2 has a pinion 21 for meshing with the first rack portion 14 of the rack shaft 1. The pinion 21 is attached to a casing 23 via bearings 22. The rotating center shaft of the pinion 21 (pinion shaft 21a) is disposed to extend upwardly from the casing 23 in such a manner as to protrude therefrom and coupled to the lower end of a steering shaft (not shown). In such an arrangement, the steering torque of the steering wheel (not shown) coupled to the upper end of the steering shaft is converted to the thrust force of the rack shaft 1 through the steering shaft, the pinion 21, and the first rack portion 14.

On the other hand, the electric motor gear 3 is disposed at a position opposite to the steering gear 2 relative to the longitudinal center position of the rack shaft 1, as shown in FIG. 1. The electric motor gear 2 has a pinion 31 for meshing with the second rack portion 15 of the rack shaft 1, as shown in FIG. 4. The pinion 31 is attached to a casing 33 via bearings 32. The pinion 31 is also coupled to an output shaft 34a of an electric motor 34 via a reduction gear 35. In such an arrangement, the driving torque of the electric motor 34 is converted to the thrust force of the rack shaft 1 through the reduction gear 35, the pinion 31, and the second rack portion 15.

It is to be noted that the rack shaft 1 has been pressed at the respective positions of the steering gear 2 and the electric motor gear 3 toward the pinions 21 and 31 by respective pressing members 16 and 17, as shown in FIGS. 3 and 4.

As shown in FIG. 2, the first rack portion 14 of the rack shaft 1 is constructed to have a constant gear ratio. That is, the first rack portion 14 has rack teeth with a fixed pitch such that a variation in steered wheel angle responsive to a variation in steering wheel rotation angle is constant. On the other hand, the second rack portion 15 is constructed to have a variable gear ratio. That is, the second rack portion 15 has rack teeth with different pitches at the center and both end portions thereof such that a variation in steered wheel angle responsive to a variation in steering wheel rotation angle is smaller with a large steering wheel rotation angle than with a small steering wheel rotation angle. In other words, the second rack portion 15 is constructed to have the gear ratio which is larger with the large steering wheel rotation angle. The second rack portion 15 is also constructed such that a variation in steered wheel angle responsive to a variation in steering wheel rotation angle is nearly constant irrespective of the steering wheel rotation angle when the steering wheel rotation angle is smaller than a specified steering wheel rotation angle θ and that a variation in steered wheel angle responsive to a variation in steering wheel rotation angle decreases with an increase in steering wheel rotation angle when the steering wheel rotation angle is equal to or larger than the specified steering wheel rotation angle θ. The gear ratio of the second rack portion 15 has been determined such that the driving torque of the electric motor 34 is nearly constant irrespective of the steering wheel rotation angle.

A description will be given herein below to the control of the electric power steering apparatus with reference to FIG. 5.

Figure 5:
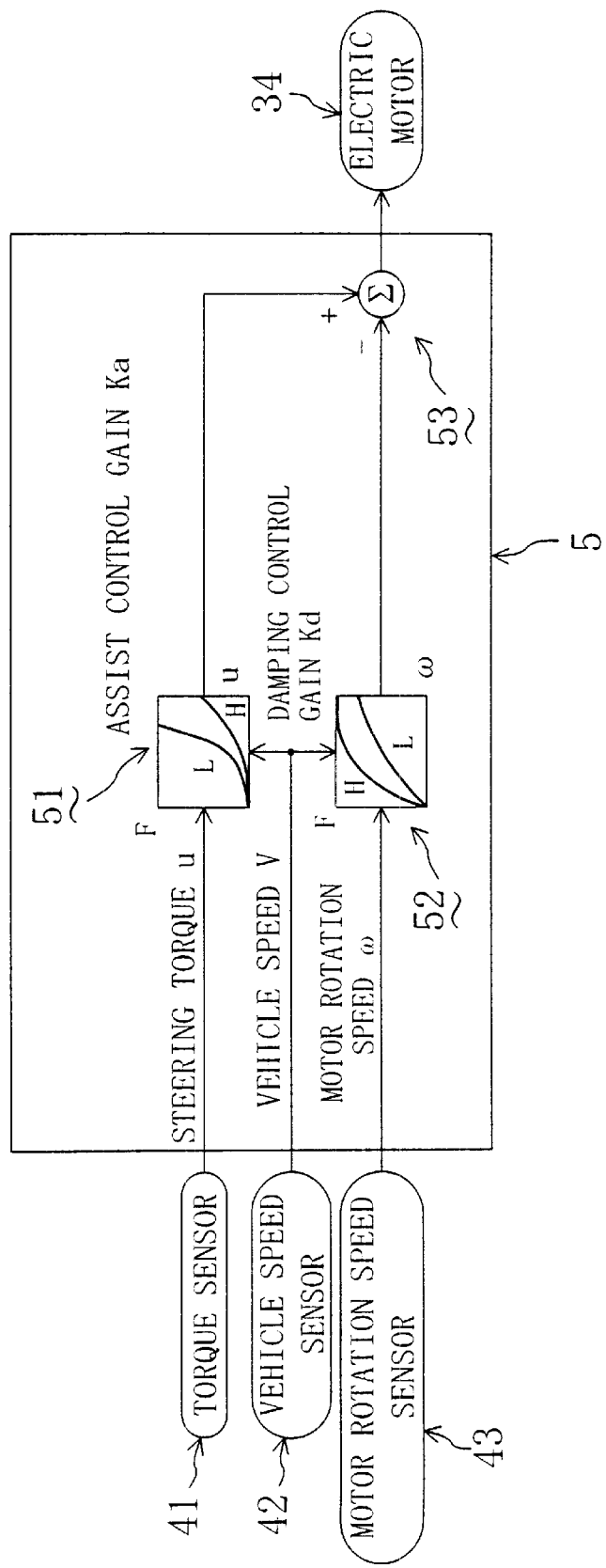
FIG. 5 is a block diagram showing a structure of a controller.

FIG. 5 shows a structure of a controller 5 for controlling the electric motor 34. The controller 5 receives respective values detected by a torque sensor 41 for detecting the steering torque u of the steering wheel, a vehicle speed sensor 42 for detecting a vehicle speed V, and a motor rotation speed sensor 43 for detecting the rotation speed ω of the electric motor 34. The vehicle speed sensor 42 may be, e.g., a wheel speed sensor provided on each of the wheels. The motor rotation speed sensor 43 may be a sensor which directly detects the rotation speed ω of the electric motor 34 or a sensor which estimates the rotation speed ω of the electric motor 34 based on a voltage applied to the electric motor 34.

The controller 5 comprises an assist control unit 51 for determining the amount of control over the electric motor 34 such that a zero value is detected by the torque sensor 41, a damping control unit 52 for determining an amount of braking imparted to the electric motor 34, and a motor control unit 53 for determining the amount of control over the electric motor 34 by adding/subtracting the respective amounts of control in the assist control unit 51 and the damping control unit 52 to control the electric motor 34 based on the amount of control over the electric motor 34.

The assist control unit 51 is constructed to determine the amount of control ($K_a \cdot u$) by obtaining the product of the steering wheel torque u, which is a value detected by the torque sensor 41, and an assist control gain $K_a$. The assist control gain $K_a$ is a variable determined by the vehicle speed V, the steering wheel torque u, and a differential value of the steering torque u, which is non-negative (i.e., positive or zero) and non-increasing relative to the vehicle speed V (i.e., which is smaller at a high vehicle speed (H) than at a low vehicle speed (L)). The assist control gain $K_a$ has been adjusted to provide a predetermined assist characteristic.

The damping control unit 52 is constructed to determine the amount of control ($K_d \cdot \omega$) by obtaining the product of the motor rotation speed ω and a damping control gain $K_d$. The damping control gain $K_d$ is a non-negative variable determined by the vehicle speed V, the steering wheel torque u, and the rotation speed of the motor, which has been adjusted to provide a specified damping characteristic, i.e., a specified constringence.

The motor control unit 53 determines a value ($K_a \cdot u - K_d \cdot \omega$) obtained by subtracting the amount of control ($K_d \cdot \omega$) in the damping control unit 52 from the amount of control ($K_a \cdot u$) in the assist control unit 51 as the amount of control over the electric motor 34 and controls the electric motor 34 based on the amount of control. The controller 5 of the electric motor 34 is not limited to the structure described above. The controller 5 may also have another structure.

In the electric power steering apparatus for a motor vehicle, the first rack portion 14 for meshing with the pinion 21 of the steering shaft is constructed to have a constant gear ratio so that a desired overall steering gear ratio is achievable even if the lock to lock of the steering wheel is reduced compared with the case where the first rack portion 14 is constructed to have a variable gear ratio. Accordingly, the lock to lock of the steering wheel is reduced to a small value.

Since the first rack portion 14 is constructed to have a constant gear ratio, a variation in steered wheel angle responsive to a variation in steering wheel rotation angle is constant. This allows the driver to operate the steering wheel with a steady steering sense and prevents the driver from feeling abnormal.

On the other hand, the second rack portion 15 is constructed such that a variation in steered wheel angle responsive to a variation in steering wheel rotation angle is smaller with a large steering wheel rotation angle than with a small steering wheel rotation angle. As a result, even if the driving torque of the electromagnetic motor 34 is small, the gear ratio between the pinion 31 of the electric motor 34 and the second rack portion 15 provides a large auxiliary steering force. This achieves a reduction in the size of the electric motor 34.

Although the response of the electric motor 34 becomes slower when a variation in steered wheel angle responsive to a variation in steering wheel rotation angle is reduced, the slower response of the electric motor 34 does not cause a problem since the steering wheel rotation angle is large when the vehicle is driving at a low speed (e.g., when the vehicle is being garaged). In the case of counter steering, the steering wheel rotation angle is large even when the vehicle is driving at a high speed. In this case, however, the counterforce of a tire is extremely small since the tire is skidding. Accordingly, the required auxiliary steering force becomes smaller so that the slower response of the electric motor 34 does not cause a problem.

In the straight-ahead region where the steering wheel rotation angle is smaller than the specified steering wheel rotation angle θ, the second rack portion 15 is also constructed such that the amount of rotation of the steered wheel in response to the steering wheel rotation angle is nearly constant. As a consequence, the auxiliary steering force responsive to a steering wheel operation has a nearly constant characteristic. As a result, a steering counterforce responsive to the steering wheel operation becomes nearly constant and prevents the driver from feeling abnormal.

In addition, the second rack portion 15 is constructed to have a gear ratio such that the driving torque of the electric motor 34 is nearly constant irrespective of the steering wheel rotation angle. In the arrangement, the driving torque of the electric motor 34 does not change even if the steering wheel is turned up. This provides a constant steering counterforce responsive to the steering wheel rotation angle and prevents the driver from feeling abnormal.

What is claimed is:

1. An electric power steering apparatus for a motor vehicle which assists a steering wheel operation by using an electric motor, the apparatus comprising:

a rack shaft;

first and second rack portions provided in the rack shaft;

a pinion of a steering shaft for meshing with the first rack portion; and a pinion of the electric motor for meshing with the second rack portion, the first rack portion being constructed to have a constant gear ratio, the second rack portion being constructed to have a variable gear ratio, wherein the second rack portion is constructed such that a variation in steered wheel angle responsive to a variation in steering wheel rotation angle is smaller with a large steering wheel rotation angle than with a small steering wheel rotation angle.

2. The apparatus of claim 1, wherein the second rack portion is constructed such that the variation in steered wheel angle responsive to the variation in steering wheel rotation angle is nearly constant irrespective of the steering wheel rotation angle when the steering wheel rotation angle is smaller than a specified angle and that the variation in steered wheel angle responsive to the variation in steering wheel rotation angle decreases with an increase in steering wheel rotation angle when the steering wheel rotation angle is equal to or larger than the specified angle.

3. The apparatus of claim 2, wherein the second rack portion is constructed to have a gear ratio such that a driving torque of the electric motor is nearly constant irrespective of the steering wheel rotation angle.

* * * * *